Oct. 26, 1943.  R. C. O'BRYAN  2,332,744
BASKET HANDLE
Filed April 8, 1941
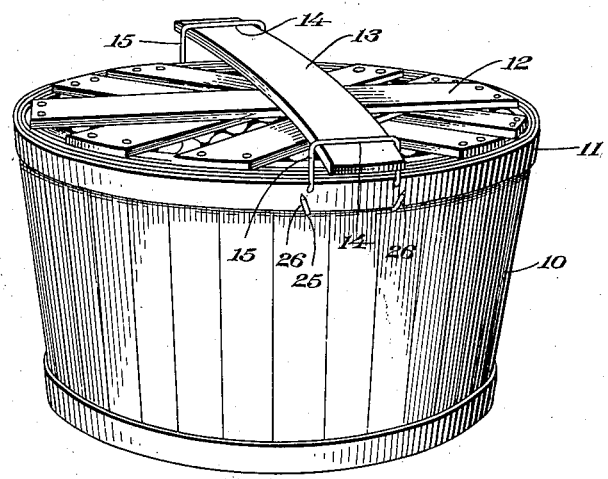
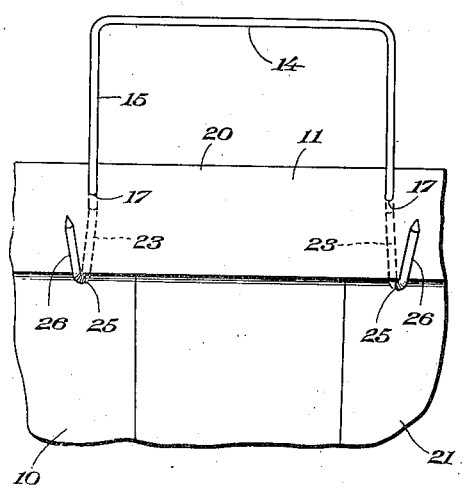
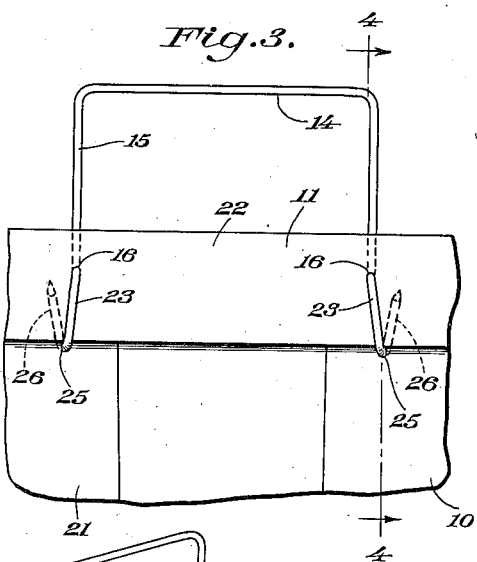
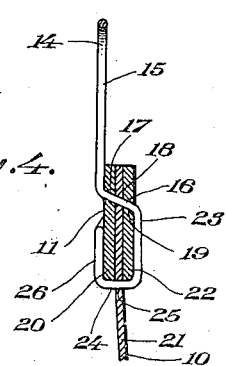
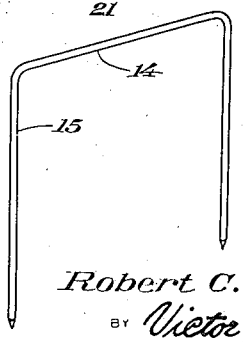
Robert C. O'Bryan INVENTOR
BY Victor J. Evans & Co.
ATTORNEYS Patented Oct. 26, 1943

2,332,744

UNITED STATES PATENT OFFICE 2,332,744

BASKET HANDLE

Robert C. O'Bryan, Little Rock, Ark.

Application April 8, 1941, Serial No. 387,493

1 Claim. (Cl. 217—125)

This invention relates to basket handles and has for an object to provide a handle which can sustain any pressure necessary to bring the basket cover down to a position where the handle will fit over the end of the clamp slat.

Slat baskets having a hoop at the upper edge, a slat cover, wire loop handles, and a clamp slat for the cover engaged at the ends through the handles, are used to ship fruit and vegetables. In packing the baskets there exists what is known as the "bulge" pack. This is caused by the fruit or vegetables being rounded up over the top of the basket until the fruit or vegetables in the center are usually three or four inches higher than the rim of the basket. In order to apply the cover to the basket in which the fruit or vegetables are bulged in this manner, it is necessary to place one end of the clamp slat under one of the handles and insert under the opposite handle a lever of about twelve or fourteen inches in length. The inserted end of the lever is then placed on the clamp slat in order to press the cover down sufficiently so that the handle can be placed over the clamp slat. During this procedure the strain is very heavy on the basket hoop where the wire handle passes through the same and often times under this strain, the hoop will be split by the handle at the point where the handle passes through the hoop so that the basket is unsuitable for use.

With the above disadvantage in mind, the present invention provides a wire handle having the end portions bent inwardly and passed through apertures formed adjacent the upper edge of the hoop which encircles the top of the basket, then bent downwardly and around the lower edge of the hoop, then bent upwardly and clinched against the outer face of the hoop, the hooks thus formed on the handle relieving the hoop of the strain at the perforation through which the handle passes to reinforce the hoop against splitting.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a perspective view of a basket equipped with handles constructed in accordance with the invention.

Figure 2 is a detail front elevation of one of the handles in applied position.

Figure 3 is a detail rear elevation of the handle shown in Figure 2.

Figure 4 is a longitudinal sectional view taken on the line 4—4 of Figure 3.

Figure 5 is a perspective view of the handle before application to the basket.

Referring now to the drawing in which like characters of reference designate similar parts in the various views, 10 designates a conventional slat basket having a hoop 11 at the exterior of the rim, a circular slat cover 12 and a clamp slat 13 for holding the cover in place.

The basket is shown provided with handles 14, constructed in accordance with the invention, through which the ends of the slat are engaged to hold the cover in place when the basket has been packed with fruit or vegetables. The handle is formed from a single length of wire, the midportion 15 of the wire being formed into a hand loop and the end portions 16 being bent inwardly, and passed through aligned openings 17, 18 and 19 in the outer member 20 of the hoop 11, in the upper ends of the slats 21 of the basket and in the inner member 22 of the hoop. The end portions are then bent downwardly, in divergent relation, as shown at 23, and around the lower edges of the members 20 and 22 of the hoop, as shown at 24, and are passed through openings 25 in the slats at the lower edge portions of the members of the hoop. Finally the ends of the handles are bent upwardly, in divergent relation, as shown at 26, along the outer face of the outer member of the hoop and clinched firmly against the outer face thereof. By the diverging relation of the inner and outer portions the pressure of the portions on the hoop is distributed along an appreciable space circumferentially of the hoop.

Since the wire passes underneath the hoop and clinches on the outer face of the hoop, a hook is formed which pulls upwardly on the hoop itself when the clamp slat 13 is being applied and relieves the hoop of the strain at the openings 17, 18 and 19 so that the hoop will not be split at the openings when great pressure is applied to the clamp slat by a lever engaged through the handle to apply the clamp slat.

From the above description it is thought that the construction and operation of the invention will be fully understood without further explanation.

What is claimed is:

A wire handle for a fruit or vegetable basket of the type having a slat wall and inner and outer hoops secured to the rim of the wall, the handle being of inverted U-form and located at the outer side of the outer hoop, the handle having portions of its side members extending through the hoops and wall near the upper edges of said parts, the handle having upwardly facing attaching loops embracing the hoops and passing through the wall, the handle portions passing through the hoops and wall inclining downwardly and inwardly to establish contact between said portions and the hoops and wall to an extent greater than the combined thickness of the hoops and wall, the cross members of the loops passing through the wall in contact with the lower edges of the hoops, and the inner and outer members of the loops being respectively arranged in downwardly and upwardly divergent relation, the cross member extending diagonally across the lower edge of the hoop to provide contact between the cross members and the hoops and wall to an extent greater than the combined thickness of the hoops and wall.

ROBERT C. O'BRYAN.